United States Patent
Lin

(10) Patent No.: US 9,667,626 B2
(45) Date of Patent: May 30, 2017

(54) NETWORK AUTHENTICATION METHOD AND DEVICE FOR IMPLEMENTING THE SAME

(71) Applicant: Keypasco AB, Gothenburg (SE)

(72) Inventor: Maw-Tsong Lin, Taipei (TW)

(73) Assignee: KEYPASCO AB, Gothenburg (SE)

( * ) Notice: Subject to any disclaimer, the term of this patent is extended or adjusted under 35 U.S.C. 154(b) by 0 days.

(21) Appl. No.: 14/882,027

(22) Filed: Oct. 13, 2015

(65) Prior Publication Data

US 2016/0036805 A1 Feb. 4, 2016

Related U.S. Application Data

(63) Continuation-in-part of application No. 13/012,350, filed on Jan. 24, 2011, now abandoned.

(30) Foreign Application Priority Data

Jan. 27, 2010 (TW) .............................. 99102251 A

(51) Int. Cl.
*H04L 29/06* (2006.01)
*G06F 21/34* (2013.01)

(52) U.S. Cl.
CPC .......... *H04L 63/0853* (2013.01); *G06F 21/34* (2013.01); *H04L 63/0815* (2013.01);
(Continued)

(58) Field of Classification Search
CPC .. H04L 63/0876; H04L 63/08; H04L 63/0853
See application file for complete search history.

(56) References Cited

U.S. PATENT DOCUMENTS 6,418,472 B1 7/2002 Mi et al.
7,861,077 B1 12/2010 Gallagher, III
(Continued)

FOREIGN PATENT DOCUMENTS

CN 1595880 A 3/2005
CN 101316167 A 12/2008
(Continued)

OTHER PUBLICATIONS

Menezes et. al., Handbook of Applied Cryptography, 1996, CRC Press.*

(Continued)

*Primary Examiner* — Khang Do
(74) *Attorney, Agent, or Firm* — Hamre, Schumann, Mueller & Larson, P.C.

(57) ABSTRACT

A method is to be implemented using a network authentication device and a user end for authenticating the user end. The network authentication device stores hardware information associated with unique identification codes of hardware components of the user end. In the method, the user end executes a terminal program for scanning the hardware components to obtain the identification codes, for establishing a hardware list according to the identification codes, and for automatically sending to the network authentication device verification data associated with the hardware list without user operation. The network authentication device verifies identity of the user end based on the verification data and the hardware information.

16 Claims, 9 Drawing Sheets

(52) U.S. Cl.
CPC ........ *H04L 63/0876* (2013.01); *H04L 63/123* (2013.01); *H04L 63/126* (2013.01); *H04L 2463/082* (2013.01)

(56) References Cited

U.S. PATENT DOCUMENTS

| | | |
|---|---|---|
| 2004/0034790 A1 | 2/2004 | Aissi |
| 2005/0165698 A1 | 7/2005 | Cho et al. |
| 2006/0010324 A1* | 1/2006 | Appenzeller ......... H04L 9/0866 713/171 |
| 2006/0072762 A1* | 4/2006 | Buer ....................... G06F 21/72 380/277 |
| 2006/0195208 A1* | 8/2006 | Sammer ................ G06F 11/006 700/97 |
| 2006/0212407 A1* | 9/2006 | Lyon ..................... G06Q 20/04 705/71 |
| 2006/0242698 A1 | 10/2006 | Inskeep et al. |
| 2007/0277035 A1 | 11/2007 | Patel et al. |
| 2008/0141313 A1* | 6/2008 | Kato .................... H04N 7/1675 725/62 |
| 2008/0260156 A1 | 10/2008 | Baba et al. |
| 2008/0262970 A1 | 10/2008 | Engelke et al. |
| 2008/0298588 A1* | 12/2008 | Shakkarwar .......... G06Q 20/02 380/255 |
| 2009/0006307 A1* | 1/2009 | Wolf ................. G06F 17/30106 |
| 2009/0144812 A1 | 6/2009 | Sasamura et al. |
| 2009/0319792 A1* | 12/2009 | Hawkes .................... H04L 9/12 713/170 |
| 2010/0229227 A1 | 9/2010 | Andre et al. |
| 2014/0269339 A1* | 9/2014 | Jaafar ................. H04L 43/0876 370/241 |

FOREIGN PATENT DOCUMENTS

| | | |
|---|---|---|
| CN | 100468438 C | 3/2009 |
| CN | 101562532 A | 10/2009 |
| JP | 2003-016037 A | 1/2003 |
| JP | 2003-244124 A | 8/2003 |
| JP | 2005-149239 | 6/2005 |
| JP | 2005-577909 A | 9/2005 |
| KR | 1020070048109 | 5/2008 |
| TW | 200726170 A | 7/2007 |
| WO | WO 2008/127431 | 10/2008 |

OTHER PUBLICATIONS

Piskvor, Detecting installed programs via registry, 2009, http://stackoverflow.com/questions/429738/detectinginstalledprogramsviaregistry.*
Notenboom, How do I find out what's installed on my machine, 2007, http://askleo.com/how_do_i_find_out_whats_installed_on_my_machine.html.*
Wikipedia, Message authentication code, Dec. 9, 2008, http://en.wikipedia.org/wiki/Message_authentication_code.
Menezes et al., Handbook of Applies Cryptography, CRC Press, I edition, 1996.
Search Report from Taiwanese Patera Application No. 099102251, dated Mar. 6, 2013, 2 pages with English translation.
European Search Repot for EP 11152033.4, Nov. 3, 2014, 8 pages.

* cited by examiner

NETWORK AUTHENTICATION METHOD AND DEVICE FOR IMPLEMENTING THE SAME

CROSS-REFERENCE TO RELATED APPLICATIONS

This application is a continuation-in-part of U.S. patent application Ser. No. 13/012,350, which is filed on Jan. 24, 2011 and which claims priority of Taiwanese Application No. 099102251, filed on Jan. 27, 2010.

FIELD

The disclosure relates to a network authentication method and device, more particularly to a network authentication method and device adapted for authenticating a user end using software.

BACKGROUND

Currently, when a user wants to transfer money at a web bank provided by a banking institution, the user needs to input a unique user identification code (user ID) and a password to access the web bank. The user ID can be obtained using a card reader reading an integrated circuit card issued by the banking institution, or can be a preset code set by the user and certified by the banking institution. After accessing the web bank, the user needs to fill an electronic transfer sheet and to input a transfer password so as to complete the transfer.

Since the user ID, the password and the transfer password may be stolen, a token or an integrated circuit card is used to provide a one-time password (OTP) to be sent to a network server of the web bank for verifying the identity of the user. Further, a token or card reader including its own screen and keys, or a flash drive having public key infrastructure certificate can be used to prevent the user ID and the password from being stolen.

However, due to the variety of web transactions, increasing numbers of web users and web crimes, and continuously progress of criminal techniques, the current verification methods have the following drawbacks.

A network content provider needs to purchase an identity verification device for each user, and the cost of customer service for personalization, distribution and troubleshooting is considerable. Further, it is quite inconvenient to the user that the user needs to have different identity verification devices for different web sites. Moreover, aside from intercepting and stealing the user ID, the password and the transfer password, the hackers also try to manipulate transaction data. Therefore, the network content provider is often forced to change hardware equipments, and the cost for changing the hardware equipments is considerable.

SUMMARY

Therefore, an object of the disclosure is to provide a network authentication method and device for authenticating a user end using software.

Accordingly, a network authentication method of the disclosure is to be implemented using a network server, a network authentication device and a user end for authenticating the user end. The user end stores a terminal program and includes a plurality of hardware components each of which has a unique identification code.

The network authentication method comprises the steps of:

a) storing, by the network authentication device, hardware information associated with the identification codes of the hardware components of the user end;

b) receiving, at the network server, a login request from the user end for accessing the network server using a web browser through a first communication channel that is established between the web browser and the network server;

c) after step b), redirecting, by the network server, the user end for connecting with the network authentication device through a second communication channel that is separate from said first communication, channel, that is established fey the user end executing the terminal program for communication between the terminal program and the network authentication device, and that is exclusive for the user end;

d) executing, by the user end, the terminal program for scanning the hardware components thereof to obtain the identification codes of the hardware components of the user end, for establishing a hardware list according to the identification codes of the hardware components thus obtained, and for automatically sending to the network authentication device verification data that is associated with the hardware list without user operation; and e) verifying, by the network authentication device, identity of the user end based on relationship between the verification data received from the user end in step d) and the hardware information stored in step a).

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
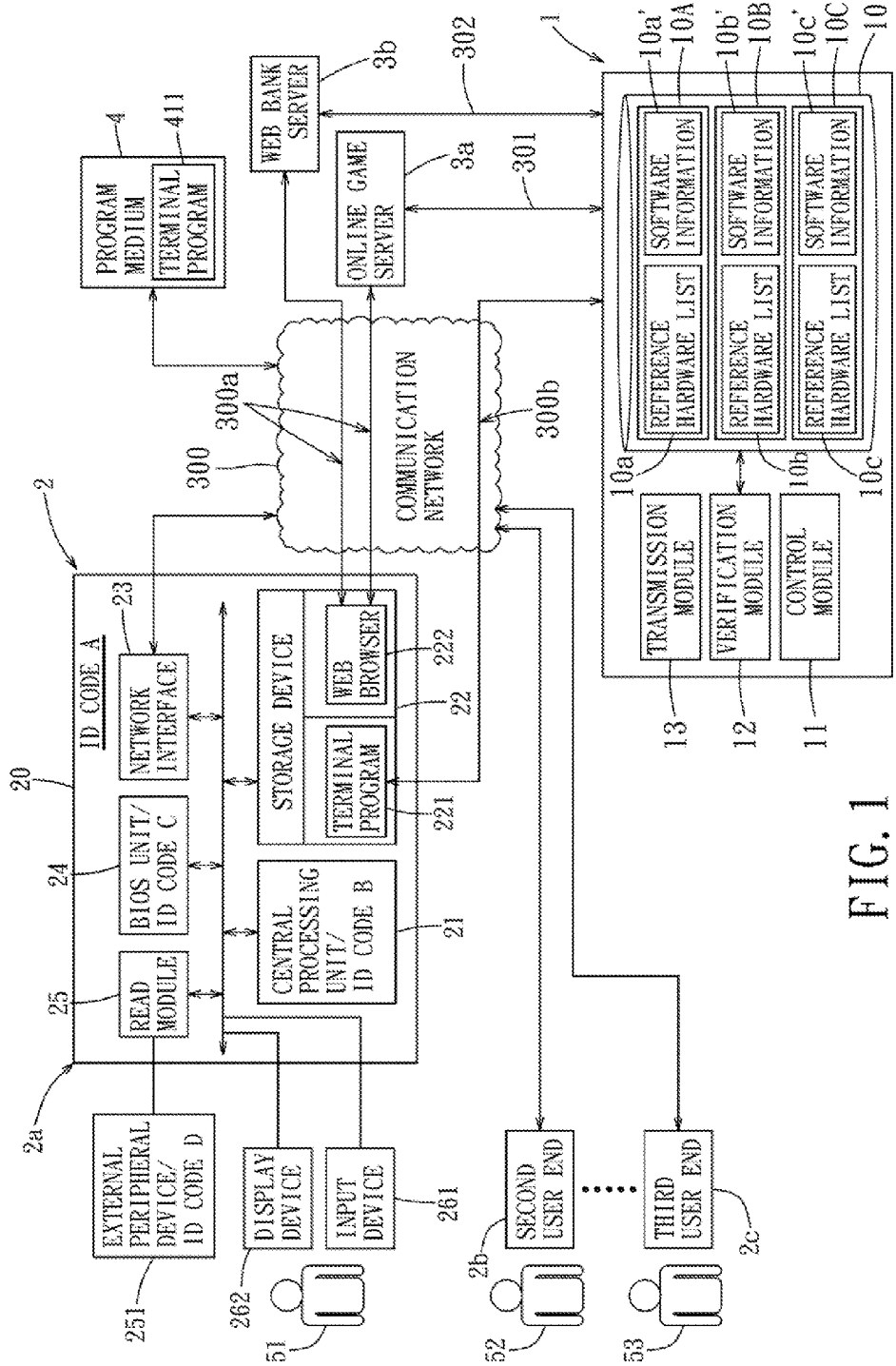
FIG. 1 is a block diagram illustrating a first embodiment of a network authentication device according to the disclosure.

Before the disclosure is described in greater detail, it should be noted that like elements are denoted by the same reference numerals throughout the disclosure.

Referring to FIG. 1, the first embodiment of a network authentication device according to the disclosure is a verification server 1 operable to cooperate with a plurality of user ends 2 and a network server 3 (e.g., an internet contents provider or ICP) to implement a network authentication method. The verification server 1 includes a database module 10, a control module 11, a verification module 12, and a transmission module 13. For exemplary purposes, the network server 3 may be, but is not limited to, an online game server 3a, a web bank server 3b, or any other server that provides a network service requiring identity verification, such as a portal website. The user ends 2 include first, second and third user ends 2a, 2b and 2c associated with first, second and third users 51, 52 and 53, respectively. The user ends 2a, 2b and 2c may be electronic equipment or handheld electronic devices capable of Internet browsing or data communications, such as notebook computers, smart phones, personal digital assistants, etc. Particularly, each of the user ends 2 is connected to the network server 3 through a first communication channel 300a (i.e., a service channel) in a communication network 300 using a web browser 222, and is connected to the verification server 1 through a second communication channel 300b (i.e., an authentication channel) in the communication network 300 that is separate from the first communication channel 300a. For each user end 2, the second communication channel 300b is exclusive for the user end 2 (i.e., each user end 2 uses an exclusively dedicated second communication channel 300b for connection to the verification server 1), and is established by the user end 2 executing a terminal program 221 for communication between the terminal program 221 and the verification server 1. The terminal program 221 is programmed specially for communicating with the verification server 1 and is stored in a specific partition of a storage device of the user end 2 (e.g., a storage device 22 of the first user end 2a), while the web browser 222 is stored in a common partition of the storage device. Accordingly, it is relatively difficult to attack the first and second communication channels 300a and 300b simultaneously for stealing information associated with the users 51-53. Moreover, the network server 3 is connected to the verification server 1 through a special channel. For example, the online game server 3a and the web bank server 3b are connected to the verification server 1 through special channels 301 and 302, respectively.

Taking the first user end 2a as an example, the first user end 2a includes a motherboard 20, a central processing unit 21, a storage device 22, a network interface 23, a basic input/output system (BIOS) unit 24, a read module 25, an external peripheral device 251, an input device 261 and a display device 262. In this embodiment, the motherboard 20, the central processing unit 21 and the BIOS unit 24 have unique identification codes (A), (B) and (C), respectively. Further, the read module 25 is a universal serial bus (USB) interface, and the corresponding external peripheral device 251 is a USB storage device (e.g., a memory card or a USB flash drive) and has a unique identification code (D). In other embodiments, the external peripheral device 251 may be a radio frequency identification (RFID) device or a near field communication (NFC) device. It should be noted that the unique identification code of the network interface 23 may be used for the network authentication method in other embodiments, and hardware components of the first user end 2a are also not limited to the disclosure herein.

Since each of the identification codes (A), (B), (C) and (D) of the hardware components (the motherboard 20, the central processing unit 21, the BIOS unit 24 and the external peripheral device 251) of the first user end 2a is unique, a combination of the identification codes (A), (B), (C) and (D) is certainly different from a combination of identification codes of hardware components of any one of other user ends 2. Thus, the combination of the identification codes of the first user end 2a is like a unique fingerprint of the first user end 2a, and can foe used for verifying the identity of the first user 51. Therefore, it is not possible to use other user ends having different hardware components to verify the identity of the first user 51.

Figure 2:
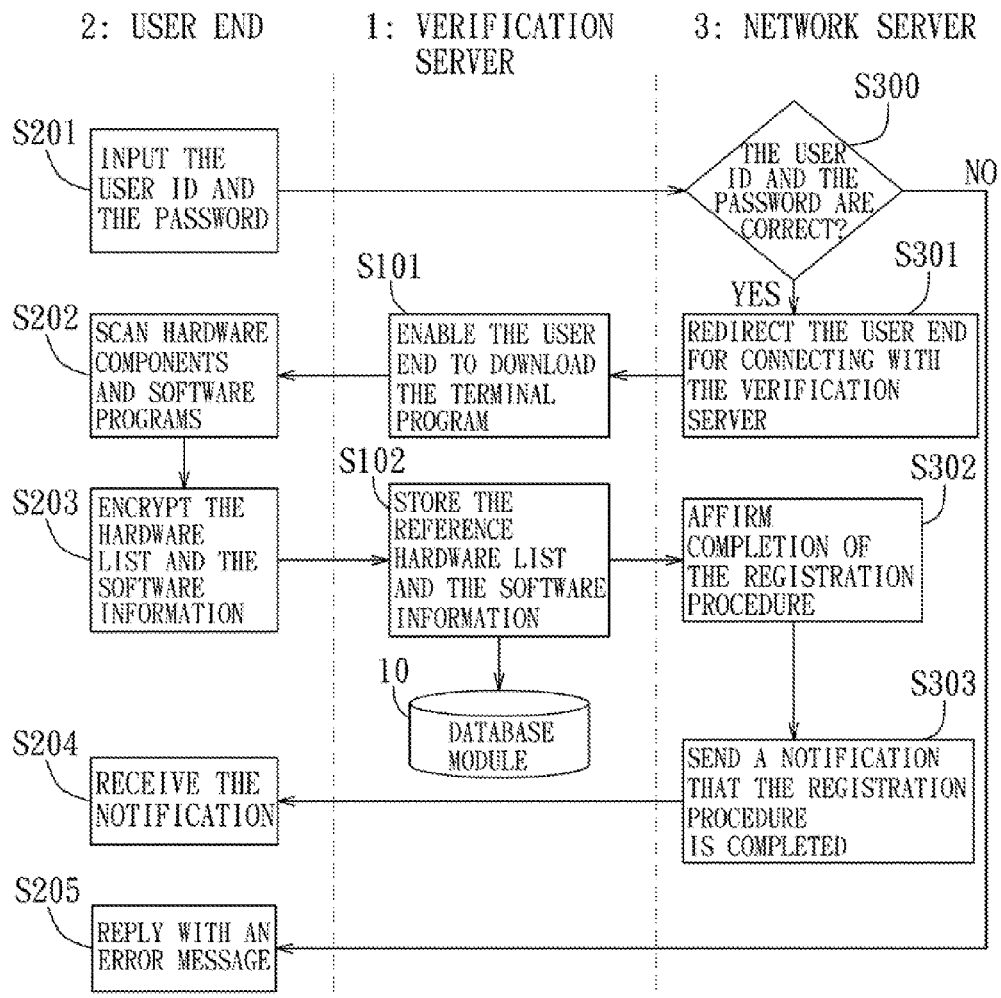
FIG. 2 is a flow chart illustrating a registration procedure of a network authentication method implemented using the network authentication device of the first embodiment according to the disclosure.

Referring to FIGS. 1 and 2, the verification server 1 cooperates with the first user end 2a and the network server 3 to implement a registration procedure of the network authentication method according to the disclosure. The registration procedure of the network authentication method includes the following steps.

In step S201, the first user 51 inputs personal information, a user identification (ID), and a password using the input device 261 of the first user end 2a at a website provided by the network server 3. The personal information, the user ID, and the password are transmitted to the network server 3 through the first communication channel 300a. In response to receipt of the personal information, the user ID and the password, the network server 3 is operable to check whether the personal information, the user ID and the password are correct in step S300. If affirmative, the network server 3 is operable to redirect the first user end 2a for connecting with the verification server 1 in step S301, so that the verification server 1 is operable to enable the first user end 2a to download a terminal program 411 from a program medium in step S101. Otherwise, the network server 3 is operable to send an error message to the first user end 2a for displaying on the display device 262 of the first user end 2a in step S205.

It should be noted that, although the program medium 4 is an external website separate from the verification server 1 as shown in FIG. 1 in this embodiment, it may be integrated as a part of the network server 3 or the verification server 1 in other embodiments. Moreover, the disclosure is not limited to downloading of the terminal program 411 from the network; for example, the program medium 4 may be a compact disc or other data carrier storing the terminal program 411 in practice.

Subsequently, after the first user end 2a stores and installs the terminal program 411 in the storage device 22 as the terminal program 221, the first user end 2a is operable to execute the terminal program 221, in step S202, for scanning the hardware components of the first user end 2a to obtain the identification codes (A)-(D) of the hardware components, and for establishing a reference hardware list 10a according to the identification codes of the hardware components thus obtained after the first user 51 inputs the user ID. Further, the first user end 2a executes the terminal program 221 for further scanning software programs installed in the first user end 2a to obtain software information of the software programs without accessing files and personal data associated with the software programs. In step S203, the first user end 2a is operable to encrypt the reference hardware list 10a and the software information with a session key, and to directly and automatically send the encrypted reference hardware list and encrypted software information to the verification server 1 through the second communication channel 300b without user operation.

The software information includes a name of each of the software programs. For example, the first user end 2a is installed with a word processing program (e.g., Microsoft Word), a web browser (e.g., Firefox), and an antivirus software program (e.g., ESET NOD32 Antivirus). The software information includes the names "Microsoft Word," "Firefox" and "ESET NOD32 Antivirus" respectively of the word processing program, the web browser 222 and the antivirus software program. The software information further includes user setting of each of the software programs, for example, an author set for Microsoft Word, a home page set for Firefox, scanning parameters set for ESET NOD32 Antivirus, etc. The software information further includes memory size assigned to each of the software programs.

In practice, the terminal program 221 allows the first user 51 to decide whether the external peripheral device 251 is scanned in step S202. Further, when the external peripheral device 251 of the first user end 2a does not have a unique identification code, the control module 11 of the verification server 1 is operable to generate a device-assigned identification code, and the transmission module 13 is operable to transmit the device-assigned identification code to the first user end 2a for storage in the external peripheral device 251 so as to serve as the identification code of the external peripheral device 251.

After the transmission module 13 of the verification server 1 receives the encrypted reference hardware list from the first user end 2a, the control module 11 of the verification server 1 is operable, in step S102, to decrypt the encrypted reference hardware list so as to obtain the reference hardware list 10a, and to store the reference hardware list 10a in the database module 10 as hardware information associated with the first user end 2a. In particular, the reference hardware list 10a consists of the user ID associated with the first user 51, and the identification codes (A), (B), (C) and (D) of the hardware components (the motherboard 20, the central processing unit 21, the BIOS unit 24 and the external peripheral device 251) of the first user end 2a. Similarly, the database module 10 further stores the reference hardware lists 10b and 10c corresponding to the second and third user ends 2b and 2c, respectively. The control module 11 is further operable to decrypt the encrypted software information to obtain the software information of the software programs installed in the first user end 2a, and to store the software information in the database module 10. The reference hardware list 10a and the software information stored in the database module 10 serve as reference data.

The verification server 1 is further operable to send a notification to the network server 3 after storing the reference hardware list 10a and the software information. Then, in response to the notification from the verification server 1, the network server 3 is operable, in step S302, to affirm that the registration procedure associated with the first user 51 is completed. Finally, the network server 3 is operable, in step S303, to send the first user end 2a a notification that the registration procedure is completed, and the first user end 2a is operable to receive the notification in step S204.

Figure 3:
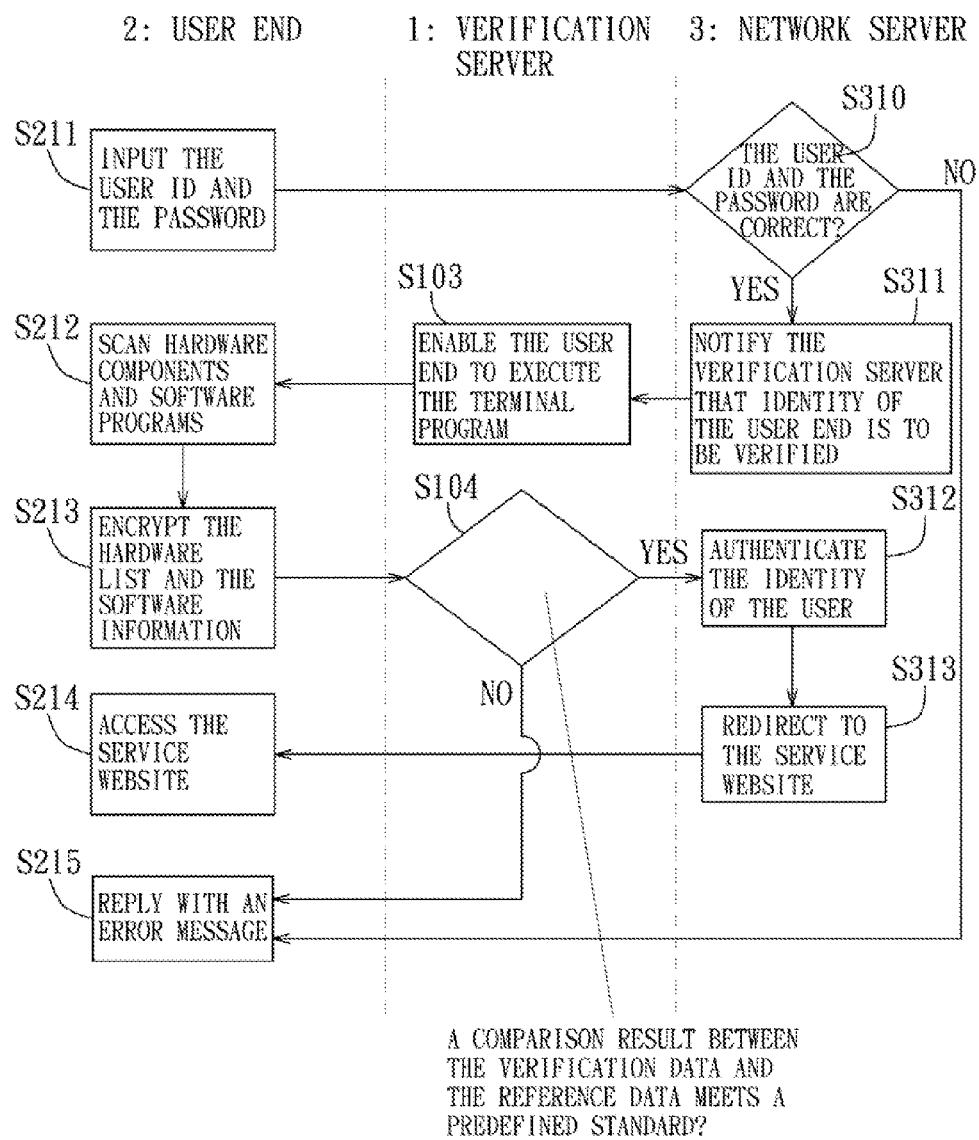
FIG. 3 is a flow chart illustrating a login procedure of the network authentication method implemented using the network authentication device of the first embodiment.

Referring to FIGS. 1 and 3, the verification server 1 cooperates with the first user end 2a and the network server 3 to implement a login procedure of the network authentication method according to the disclosure. The login procedure of the network authentication method includes the following steps.

In step S211, the first user 51 Inputs the user ID and the password using the input device 261 of the first user end 2a at the service website provided by the network server 3, and the first user end 2a is operable to transmit the user ID and the password to the network server 3 through, the first communication channel 300a. In step S310, the network server 3 is operable to verify whether the user ID and the password thus received are correct. In particular, the network server 3 is operable to determine whether the user ID and the password inputted in step S211 conform with the user ID and the password provided in the above-mentioned registration procedure. In alternative embodiments, the verification server 1 can be configured to verify the user ID and the password associated with the first user 51 instead of the network server 3.

If it is determined that either the user ID or the password is incorrect in step S310, the network server 3 is operable to send an error message to the first user end 2a for displaying on the display device 262 of the first user end 2a in step S215. If it is determined that both of the user ID and the password are correct in step S310, the network server 3 is operable to notify the verification server 1 that identity of the first user end 2a associated with the first user 51 is to be verified in step S311. The network server 3 is further operable to redirect the first user end 2a. for connecting with the verification server 1 through the second communication channel 300b that is established by the first user end 2a executing the terminal program 221 for communication between the terminal program 221 and the verification server 1 (i.e., the network authentication device), and that is exclusive for the first user end 2a.

In step S103, the verification server 1 is operable to enable the first user end 2a to execute the terminal program 221 stored in the storage device 22 of the first user end 2a. In step S212, the first, user end 2a is operable to execute the terminal program 221 for scanning the hardware components thereof to obtain the identification codes of the hardware components of the first user end 2a, and for establishing a hardware list according to the identification codes of the hardware components thus obtained. In addition, the first user end 2a executes the terminal program 221 for further scanning the software programs currently installed in the first user end 2a to obtain software information of the software programs without accessing files and personal data associated with the software programs.

Then, in step S213, the first user end 2a is operable to encrypt the hardware list and the software information, which are obtained in step S212, with the session key, and to automatically send the encrypted hardware list and the encrypted software information as verification data for verifying identify of the first user end 2a to the verification server 1 through the second communication channel 300b without user operation.

In step S104, the control module 11 of the verification server 1 is operable to decrypt the verification data from the first user end 2a to obtain the hardware list and the software information. Then, the verification module 12 of the verification server 1 is operable to compare the hardware list and the software information thus obtained with the reference hardware list 10a and the software information stored in the database module 10, respectively, for verifying the identity of the first user 51 associated with the first user end 2a.

When a comparison result between the verification data (i.e., the hardware list and the software information obtained in step S104) and the reference data (i.e., the reference hardware list 10a and the software information stored in the database module 10) do not meet a predefined standard, the verification module 12 is operable to determine that the verification of the first user 51 is unsuccessful and to send the error message to the first user end 2a. Accordingly, the first user end 2a is denied access to the service website provided by the network server 3, and is operable to display the error message on the display device 262 in step S215. On the other hand, when the comparison result between the verification data and the reference data meets the predefined standard, the verification module 12 is operable to determine that the verification of the first user 51 is successful, and to notify the network server 3 of the result of the verification made thereby. Thus, the network server 3 is operable to authenticate the identity of the first user 51 in step S312, and then, to redirect the first user end 2a associated with the first user 51 for connecting with the service website provided by the network, server 3 in step S313. In step S214, the first user end 2a is authorized to access the service website. In this embodiment, the verification module 12 is operable to verify that the identity of the first user 51 is authorized and to determine that the verification of the first user 51 is successful when similarity between the verification data and the reference data is greater than, for example, 60% (i.e., the predefined standard). The predefined standard is adjustable by the verification server 1 or the network server 3 for different security levels. For example, the predefined standard set for the online game server 3a may be lower than that set for the web bank server 3b since the web bank server 3b requires a relatively higher security level.

The verification server 1 is configured to automatically update the reference data 10A stored in the database module 10 with the verification data when the similarity between the verification data and the reference data 10A is greater than the predefined standard, such that the verification data is stored in the database module 10 and serves as the reference data 10A now. Thus, the reference data 10A stored in the database module 10 is always up to date when some of the hardware components of the user end 2 have been changed.

In particular, the login procedure of the network authentication method is implemented within a specific session, and the session key used in step S213 is particular to the specific session.

Figure 4:
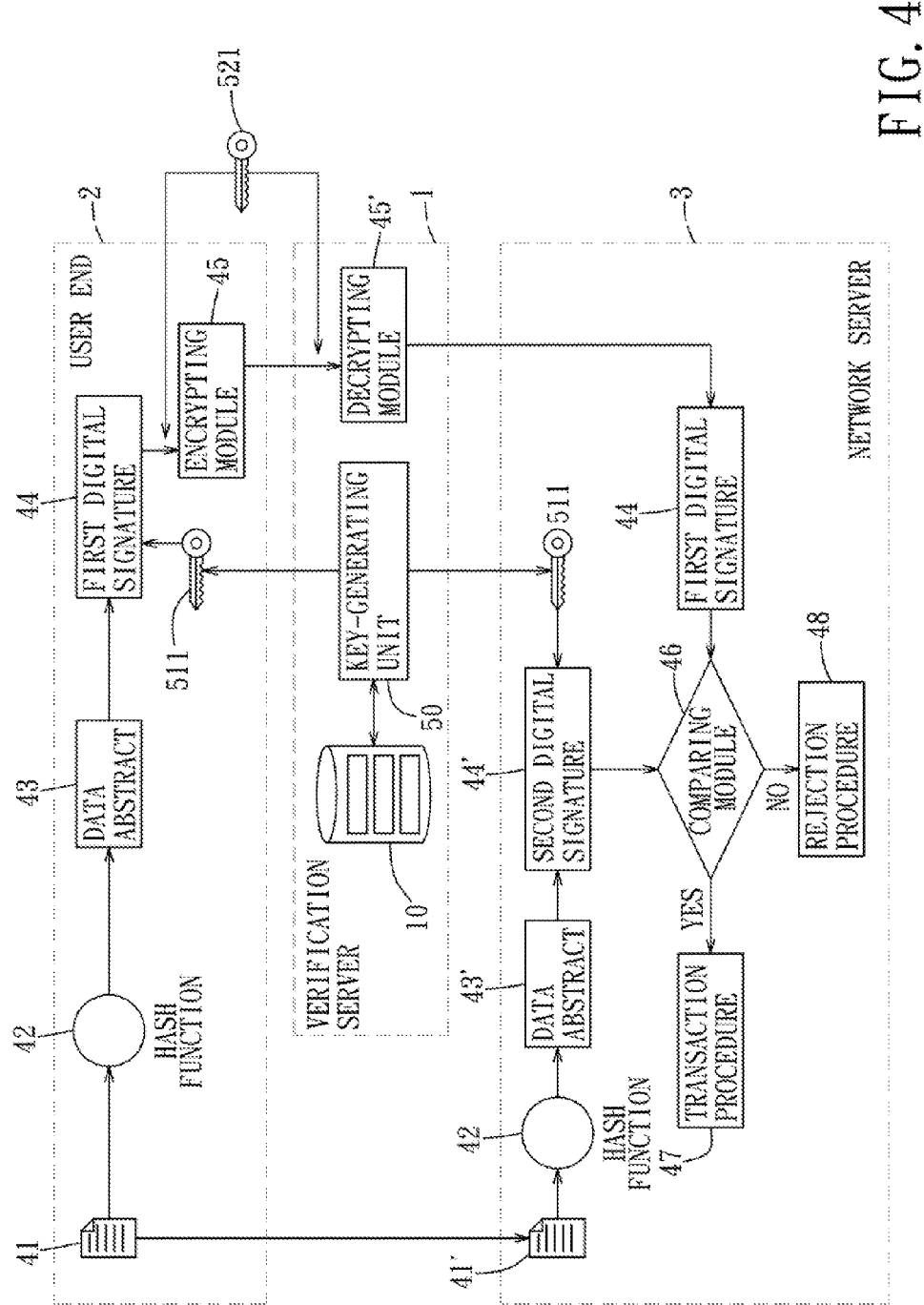
FIG. 4 is a schematic diagram illustrating the network authentication device implementing the network security authentication method for processing a digital signature.

After the first user end 2a is authorized to access the service website in the login procedure, the verification server 1 cooperates with the first user end 2a and the network server 3 to further implement the network security authentication method for processing a digital signature when the first user 51 intends to conduct an electronic transaction with the network server 3. The network security authentication method for processing a digital signature will be described in detail below with reference to FIGS. 1 and 4.

The verification server 1 further includes a key-generating unit 50 and a decrypting module 45', the terminal program 221 includes a hash function 42 and an encrypting module 45, and the network server 3 includes a comparing module 46. The key-generating unit 50 of the verification server 1 is operable to generate a key 511 according to the reference hardware list 10a stored in the database module 10. The key 511 is sent to the first user end 2a through the second communication channel 300b in the communication network 300, and is sent to the network server 3 through the special channel 301 (302). In particular, the verification server 1 directly sends the key 511 to the first user end 2a and the network server 3 without encrypting the key 511.

When the first user 51 intends to conduct an electronic transaction with the network server 3 using the first user end 2a, the first user end 2a is operable to generate transact ion data 41 related to the electronic transaction and to send the transaction data 41 to the network server 3 through the first communication channel 300a in the communication network 300. The terminal program 221 of the first user end 2a uses the hash function 42 to draw out a data abstract 43 from the transaction data 41, and processes the data abstract 43 into a first digital signature 44 using the key 511 sent by the verification server 1. Then, the encrypting module 45 is operable to encrypt the first digital signature 44 with a session key 521, and the encrypted first digital signature is sent to the verification server 1 through the second communication channel 300b. The decrypting module 45' of the verification server 1 is operable to decrypt the encrypted first digital signature to obtain the first digital signature 44, and then, the first digital signature 44 is sent to the network server 3.

After the network server 3 receives the key 511 from the verification server 1 and the transaction data 41' from the first user end 2a, the network server 3 is operable to draw oat a data abstract 43' from the transaction data 41' using the hash function 42. Then, the network server 3 is operable to process the data abstract 43' into a second digital signature 44' using the key 511 sent by the verification server 1. The comparing module 46 of the network server 3 is operable to compare the second digital signature 44' with the first digital signature 44 generated by the first user end 2a, When the second digital signature 44' conforms with the first digital signature 44, the network server 3 is operable to determine that the transaction data 41 was not tampered during transmission from the first user end 2a to the network server 3 as the transaction data 41' through the first communication channel 300a. Subsequently, the network server 3 is operable to implement a transaction procedure 47 for completing the electronic transaction according to the transaction data 41'. On the other hand, when the second digital signature 44' does not conform with the first digital signature 44, the network server 3 is operable to determine that the transaction data 41' was tampered during transmission from the first user end 2a to the network server so that the data abstract 43' from the tampered transaction data 41' is not identical to the data abstract 43 from the original transaction data 41. Thus, the network server 3 is operable to implement a rejection procedure 48 for rejecting the electronic transaction.

In alternative embodiments, the comparing module 46 of the network server 3 can be omitted, and the network server 3 is operable to send the second digital signature 44' to the verification server 1. Then, the verification server 1 is configured to compare the second digital signature 44' with the first digital signature 44 instead of the comparing module 46, and to send the comparing result to the network server 3. In response to the comparing result from the verification server 1, the network server 3 is operable to alternatively implement the transaction procedure 47 and the rejection procedure 48.

Figure 5:
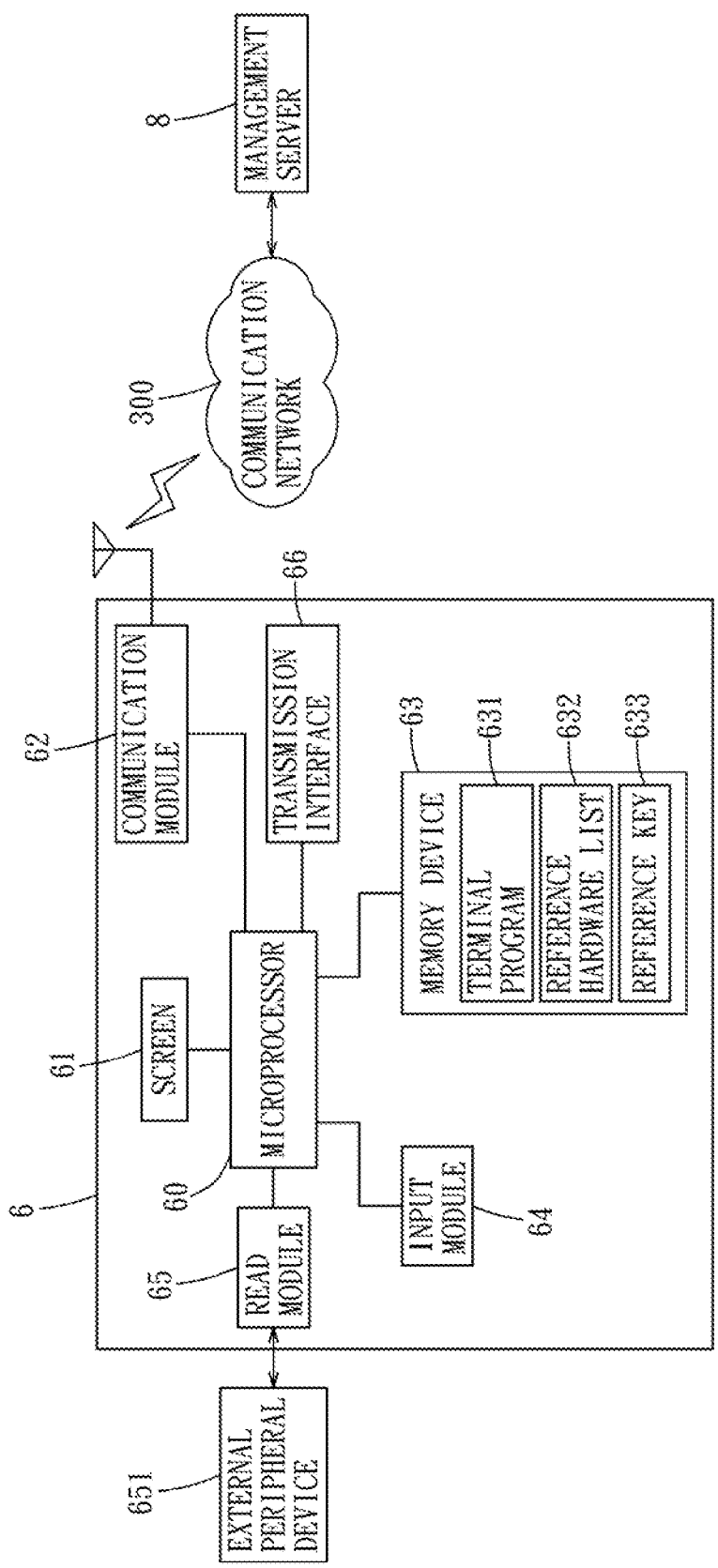
FIG. 5 is a block diagram illustrating a second embodiment of a network authentication device according to the disclosure.

Referring to FIG. 5, the second embodiment of a network authentication device according to the disclosure is a management server 8 that integrates the functions of the verification server 1 and the network server 3 of the first embodiment. In this embodiment, the user end is a portable electronic device 6, such as a smart phone.

The portable electronic device 6 includes a microprocessor 60, a screen 61, a communication module 62, a transmission interface 66, a memory device 63, an input module 64, and a read module 65. The communication module 62 is operable to communicate with the management server 8 through a communication network 300. The memory device 63 stores a terminal program 631, a reference hardware list 632, and a reference key 633 made from the reference hardware list 632. For instance, the read module 65 is a memory card reader, and an external peripheral device 651 connected thereto is a memory card. The reference hardware list 632 is associated with a combination of the identification codec of the microprocessor 60, the screen 61, the communication module 62, the transmission interface 66, the memory device 63, the input module 64, and/or the external peripheral device 651. While the terminal program 631 is similar to the terminal program 221 in the first embodiment, it is required to input a correct personal identification number (PIN) for executing the terminal program 631 in this embodiment. In other embodiments, the user associated with the portable electronic device 6 only needs to input the PIN upon turning on the portable electronic device 6, and doest not need to input the PIN or a new PIN again for executing the terminal program 631.

Figure 6:
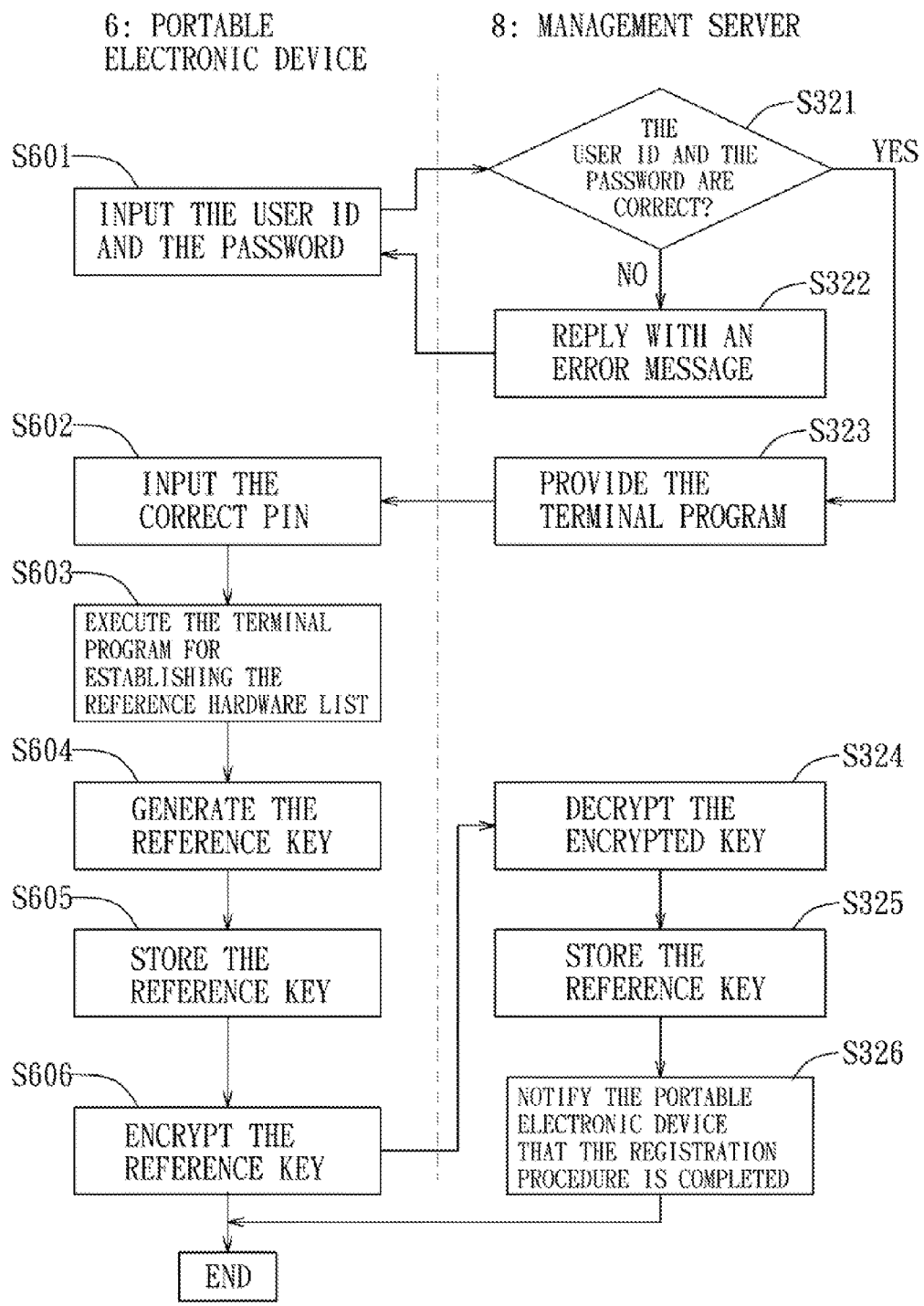
FIG. 6 is a flow chart illustrating a registration procedure of a network authentication method implemented using the network authentication device of the second embodiment according to the disclosure.

Referring to FIGS. 5 and 6, the management server 8 is operable to cooperate with the portable electronic device 6 to implement a registration procedure of the network authentication method according to the disclosure. The registration procedure of the network authentication method includes the following steps.

In step S601, after the portable electronic device 6 is connected to the management server 8 using the communication module 62 through the communication network 300, a user associated with the portable electronic device 6 uses the input module 64 of the portable electronic device 6 to input a user identification (ID) and a password at a website provided by the management server 8. In response to receipt of the user ID and the password, the management server 8 is operable to check whether the user ID and the password are correct in step S321. If either the user ID or the password is incorrect, the management server 8 is operable to reply with an error message to the portable electronic device 6 in step S322. On the other hand, if both the user ID and the password are correct, the management server 8 is operable to provide the terminal program 631 to the portable electronic device 6 in step S323.

When the user of the portable electronic device 6 inputs the correct PIN in step S602, the portable electronic device 6 is operable, in step S603, to execute the terminal program 631 for scanning hardware components of the portable electronic device 6 to obtain identification codes of the hardware components, and for establishing and storing the reference hardware list 632. Then, the portable electronic device 6 executes the terminal program 631 for generating the reference key 633 based on the reference hardware list 632 in step S604, and is operable to store the reference key 633 in the memory device 63 in step S605. In step S606, the portable electronic device 6 is operable to encrypt the reference key 633 with a session key so as to obtain an encrypted key, and to send the encrypted key to the management server 8. In other embodiments, step S602 may be omitted since the user already inputted the PIN upon turning on the portable electronic device 6.

After receiving the encrypted key from the portable electronic device 6, the management server 8 is operable to decrypt the encrypted key so as to obtain the reference key 633 in step S324, and to store the reference key in step S325. Finally, in step S326, the management server 8 is operable to notify the portable electronic device 6 that the registration procedure is completed.

Figure 7:
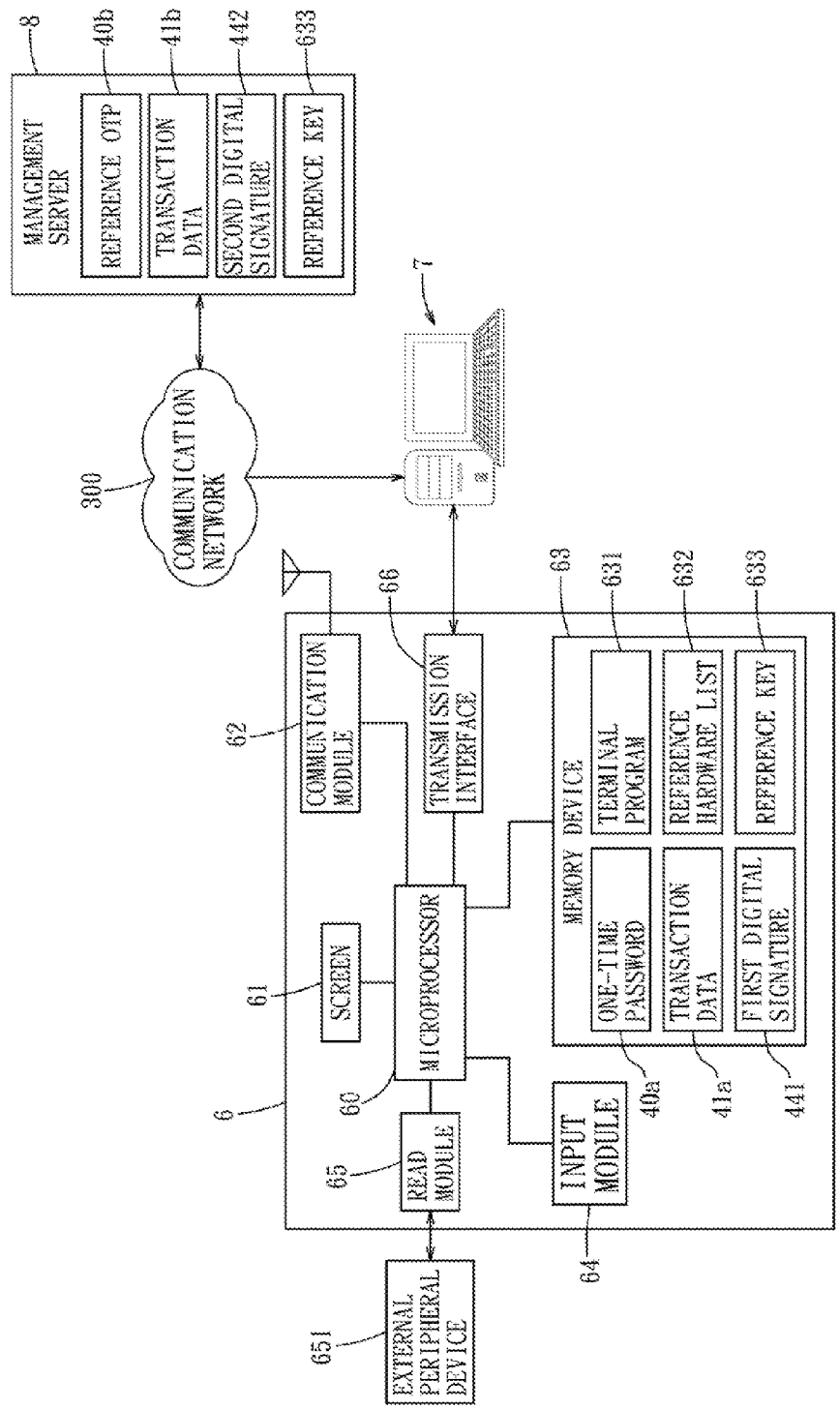
FIG. 7 is a block diagram illustrating the network authentication device of the second embodiment that is configured to implement login and transaction procedures of the network authentication method of the disclosure.

Referring to FIG. 7, the portable electronic device 6 is connected to a computer 7 through the transmission interface 66 that may be either a cable transmission interface or a wireless transmission interface. The input module 64 of the portable electronic device 6 is a key panel or a touch panel for generating electronic data in responses to an input from the user of the portable electronic device 6. The electronic data is transmitted, to the computer 7 through the transmission interface 66, and is subsequently sent to the management server 8 through the communication network 300. In the case of the portable electronic device 6 without the transmission interface 66, the user can use a keyboard of the computer 7 to input the electronic data displayed on the screen 61 of the portable electronic device 6 so as to transmit the electronic data to the management server 8.

Figure 8:
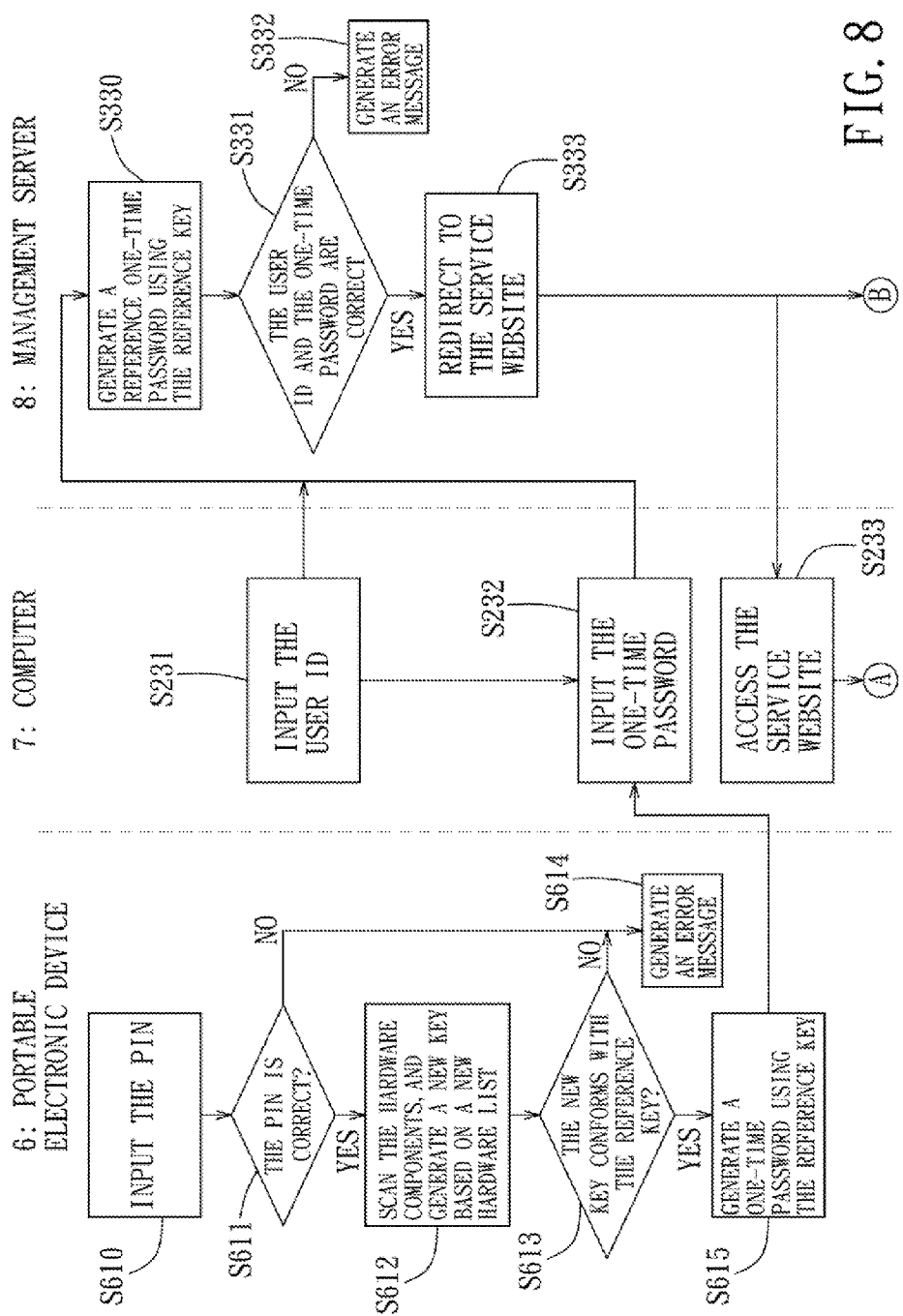
FIG. 8 is a flow chart illustrating the login procedure of the network authentication method implemented using the network authentication device of the second embodiment.

Referring to FIGS. 7 and 8, the management server 8 is operable to cooperate with the portable electronic device 6 and the computer 7 to implement a login procedure of the network authentication method according to the disclosure. The login procedure of the network authentication method includes the following steps.

First, the user of the portable electronic device 6 needs to input the PIN in step S610. Then, in step S611, the portable electronic device 6 is operable to determine whether the PIN inputted in step S610 is correct. If it is determined that the PIN is incorrect, the portable electronic device 6 is operable to generate an error message in step S614. If the PIN inputted in step S610 is correct, the portable electronic device 6 is operable, in step S612, to execute the terminal program 631 for scanning the hardware components of the portable electronic device 6 to obtain identification codes of the hardware components, for establishing a new hardware list according to the identification codes thus obtained, and for generating a new key based on the new hardware list 632 thus established. In other embodiments, step S610 and S611 may be omitted, and the portable electronic device 6 is operable to directly implement step S612 when the user wants to use the portable electronic device 6 for accessing the service website provided by the management server 8.

Then, in step S613, the portable electronic device 6 is operable to execute the terminal program 631 for comparing the new key generated in step S612 with the reference key 633 stored in the memory device 63. When the new key does not conform with the reference key 633, it can be determined that the new key was tampered or that the terminal program 631 and the reference key 633 were moved to another device, and the flow goes to step S614. When the new key conforms with the reference key 633, it can be determined that the new key and the reference key 633 were generated using the same device and that the terminal program 631 and the reference key 633 were not moved to another device, and the portable electronic device 6 is operable to execute the terminal program 631 for further generating a one-time password (OTP) 40*a* using the reference key 633 in step S615. Then, the OTP 40*a* is transmitted to the computer 7 through the transmission interface 66 of the portable electronic device 6. In the case of the portable electronic device 6 without the transmission interface 66, the user can use the keyboard of the computer 7 to input the OTP 40*a* displayed on the screen 61 of the portable electronic device 6 in step S232.

In order to login the service website provided by the management server 8, the user needs to input the user ID using the keyboard of the computer 7 in step S231, and then, the user ID and the OTP 40*a* are sent to the management server 8 through the communication network 300.

In step S330, the management server 8 is operable to generate a reference one-time password 40*b* using the reference key 633 stored therein in step S325 of the registration procedure. Upon receiving the user ID and the OTP 40*a* from the computer 7, the management server 8 is operable to compare the OTP 40*a* with the reference OTP 40*b* and to determine whether the user ID is correct in step S331. If the OTP 40*a* does not conform with the reference OTP 40*b* or the user ID is incorrect, the management server 8 is operable to generate an error message in step S332. If the OTP 40*a* conforms with the reference OTP 40*b* and the user ID is correct, the management server 8 is operable to redirect the computer 7 for connecting with the service website provided by the management server 8 in step S333. In step S233, the computer 7 is authorized to access the service website.

Figure 9:
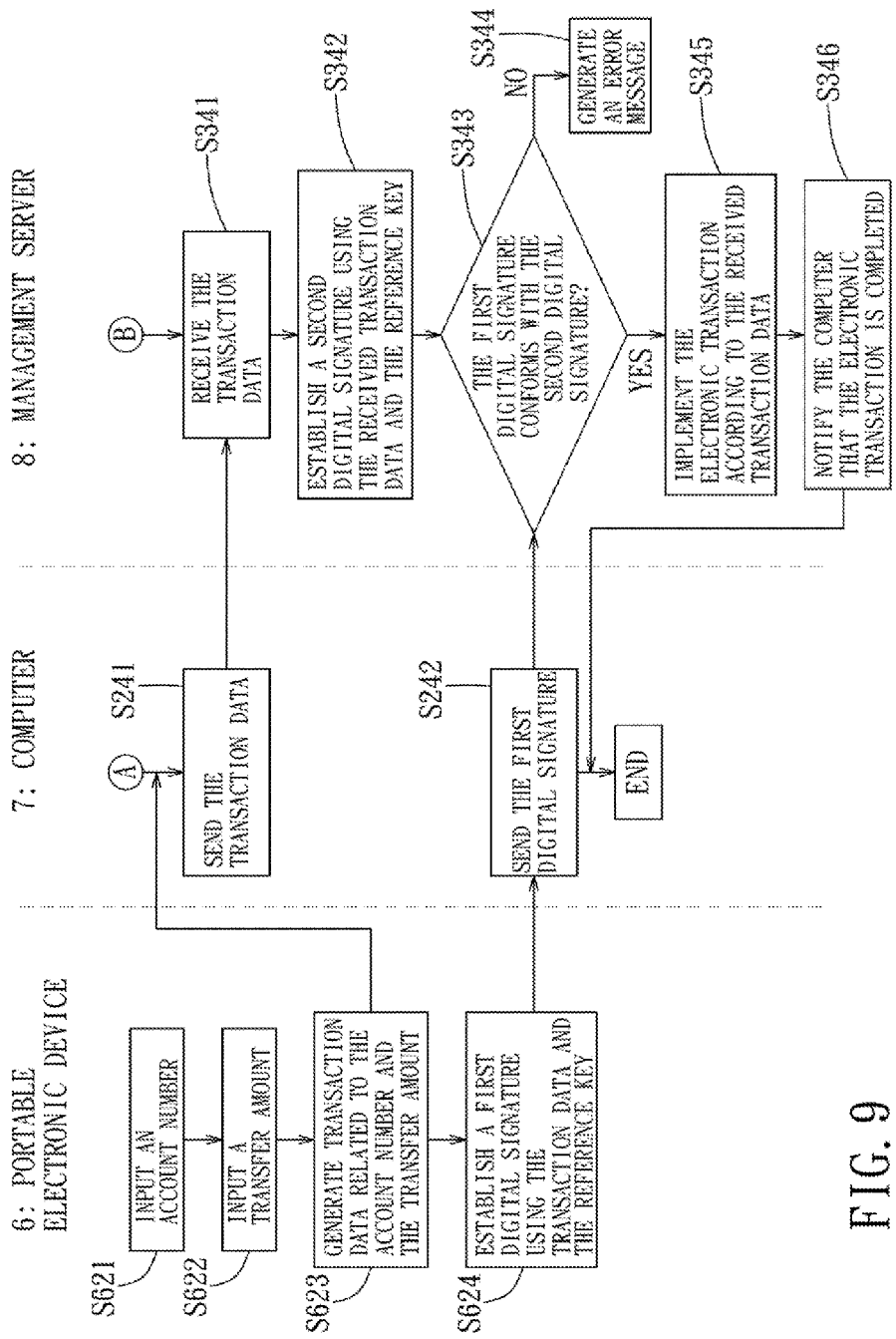
FIG. 9 is a flow chart illustrating the transaction procedure of the network authentication method implemented using the network authentication device of the second embodiment.

After the computer 7 has received authorization to access the service website in the login procedure, the management server 8 cooperates with the portable electronic device 6 and the computer 7 to further implement the network security authentication method for processing a digital signature when the user intends to conduct an electronic transaction with the management server 8. The network security authentication method for processing a digital signature will be described in detail below with reference to FIGS. 7 and 9.

For conducting the electronic transaction with the management server 8, the user needs to input a receiving account number in step S621 and to input a transfer amount in step S622 using the input module 64 of the portable electronic device 6. In step S623, the portable electronic device 6 is operable to generate transaction data 41*a* related to the account number and the transfer amount, and to send the transaction data 41*a* to the computer 7 through the transmission interface 66. Further, in step S624, the portable electronic device 6 is operable to execute the terminal program 631 for establishing a first digital signature 441 using the transaction data 41*a* and the reference key 633, and to send the first digital signature 441 to the computer 7 through the transmission interface 66.

In response to receipt of the transaction data 41*a* and the first digital signature 441, the computer 7 is operable to send the transaction data 41*a* and the first digital signature 441 to the management server 8 through the communication network 300 in steps S241 and S242, respectively. It should be noted that, in the case of the portable electronic device 6 without the transmission interface 66, the user may use the keyboard of the computer 7 to input the account number and the transfer amount so that the computer 7 is operable to obtain the transaction data 41*a* consisting of the account number and the transfer amount.

The management server 8 is operable to receive transaction data 41*b* corresponding to the transaction data 41*a* from the computer 7 through the communication network 300 in step S341, and then, to establish a second digital signature 442 using the received transaction data 41*b* and the reference key 633 in step S342. In step S343, the management server 8 is operable to receive the first digital signature 441, and to compare the first digital signature 441 with the second digital signature 442. If the first digital signature 441 does not conform with the second digital signature 442, the management server 8 is operable to determine that the transaction data 41*a* was tampered during transmission and that the received transaction data 41*b* is different from the transaction data 41*a*. Therefore, the management server 8 is operable to reject the electronic transaction and to generate an error message in step S344. If the first digital signature 441 conforms with the second digital signature 442, the management server 8 is operable to determine that the received transaction data 41*b* is correct and is identical to the transaction data 41*a*. Accordingly, the management server 8 is operable to implement the electronic transaction according to the account number and the transfer amount of the received transaction data 41*b* in step S345. Finally, in step S346, the management server 8 is operable to notify the computer 7 that the electronic transaction is completed.

In sum, the network authentication method implemented using the network authentication device according to the disclosure has the following advantages. First, the user end may execute the terminal program for scanning the hardware components of the user end and for establishing the hardware list according to the identification codes of the hardware components thus obtained for subsequent use in authenticating the user. Thus, a network content provider does not need to purchase additional equipment for authentication, and does not need to provide the user with a personalized token, integrated circuit card, USB flash drive, etc. Also, the user does not need to have additional authentication. devices for different websites. Further, in the first embodiment, since the user end is connected to the network server through the first communication channel and is connected to the verification server through the second communication channel that is separate from the first communication channel, it is relatively difficult to attack the first and second communication channels simultaneously for stealing and tampering the data sent by the user end.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A network authentication method to be implemented using a network server, a network authentication device and a user end for authenticating the user end, the user end storing a terminal program and including a plurality of hardware components each of which has a unique identification code, the network authentication method comprising the steps of:

a) storing, by the network authentication device, hardware information associated with the identification codes of the hardware components of the user end;

b) receiving, at the network server, a login request from the user end for accessing the network server using a web browser through a first communication channel that is established between the web browser and the network server;

c) after step b), redirecting, by the network server, the user end for connecting with the network authentication device through a second communication channel that is separate from the first communication channel, that is established by the user end executing the terminal program for communication between the terminal program and the network authentication device, and that is exclusive for the user end;

d) executing, by the user end, the terminal program for scanning the hardware components thereof to obtain the identification codes of the hardware components of the user end, for establishing a hardware list according to the identification codes of the hardware components thus obtained, and for automatically sending to the network authentication device verification data that is associated with the hardware list without user operation;

e) verifying, by the network authentication device, identity of the user end based on relationship between the verification data received from the user end in step d) and the hardware information stored in step a;

f) generating, by the network authentication device, a key according to the hardware information stored therein, and to directly send the key to the user end and the network server without encrypting the key;

g) when the user end intends to conduct an electronic transaction with the network server, generating, by the user end, a first digital signature corresponding to transaction data of the electronic transaction using the key sent by the network authentication device and to send the transaction data and the first digital signature to the network server, and generating, by the network server, a second digital signature corresponding to the transaction data received from the user end using the key sent by the network authentication device; and h) comparing, by the network server, the first digital signature from the user end with the second digital signature generated thereby, and to determine that the transaction data was not tampered during transmission from the user end to the network server when the first digital signature conforms with the second digital signature.

2. The network authentication method as claimed in claim 1, further comprising, prior to step a), the steps of:

i) downloading, by the user end, the terminal program from a specified website; and ii) executing, by the user end, the terminal program for scanning the hardware components thereof to obtain the identification codes of the hardware components, for establishing a reference hardware list serving as the hardware information according to the identification codes thus obtained, and for sending the hardware information to the network authentication device for storage in step a).

3. The network authentication method as claimed in claim 2, wherein:

in step i), the user end is configured to download the terminal program from the specified website during registration of the user end at the network server;

the network authentication method further comprising after step a) the step of notifying, by the network authentication device, the network server that the hardware information of the user end has been stored in the network authentication device.

4. The network authentication method as claimed in claim 1, wherein:

in step c), the network server is further configured to notify the network authentication device that identity of the user end is to be verified; and in step e), the network authentication device is configured to notify the network server of result of verification made thereby.

5. The network authentication method as claimed in claim 1, wherein:

in step d), the verification data sent to the network authentication device is obtained by encrypting the hardware list with a session key; and in step e), the network authentication device is configured to decrypt the verification data to obtain the hardware list, and to compare the hardware list with the hardware information stored therein for verifying the identity of the user end.

6. The network authentication method as claimed in claim 1, wherein step a) includes the sub-steps of:

a1) executing, by the user end, the terminal program for scanning the hardware components thereof to obtain the identification codes of the hardware components, and for generating and storing a reference key using the identification codes thus obtained;

a2) encrypting, by the user end, the reference key so as to obtain an encrypted key and to send the encrypted key to the network authentication device; and a3) decrypting, by the network authentication device, the encrypted key received from the user end so as to obtain the hardware information to be stored in the network authentication device.

7. The network authentication method as claimed in claim 6, wherein:

in step d), the verification data sent to the network authentication device is a one-time password obtained using the reference key generated in sub-step a1); and in step e), the network authentication device is configured to generate a reference one-time password using the hardware information stored therein, and to compare the verification data with the reference one-time password for verifying the identity of the user end.

8. The network authentication method as claimed in claim 7, wherein the user end is configured to execute the terminal program for scanning the hardware components to obtain new identification codes of the hardware components, for generating a new key using the new identification codes of the hardware components, for comparing the new key with the reference key generated in sub-step a1), and for generating the verification data when the new key conforms with the reference key.

9. The network authentication method as claimed in claim 6, further comprising the steps of:

when the user end intends to conduct an electronic transaction with the network authentication device, generating, by the user end, a first digital signature corresponding to transaction data of the electronic transaction using the reference key and to send the transaction data and the first digital signature to the network authentication device, and generating, by the network authentication device, a second digital signature corresponding to the transaction data received from the user end using the hardware information stored therein; and comparing, by the network authentication device, the first digital signature from the user end with the second digital signature generated thereby, and to determine that the transaction data was not tampered during transmission from the user end to the network authentication device when the first digital signature conforms with the second digital signature.

10. The network authentication method as claimed in claim 1, wherein the hardware information stored in the network authentication device in step a) and the verification data sent to the network authentication device in step d) are associated with the identification codes of at least one of the following hardware components of the user end: a central processing unit; a basic input/output system (BIOS) unit; a storage device; a network interface; a motherboard; and an external peripheral device.

11. The network authentication method as claimed in claim 1, wherein:

in step a), the network authentication device further stores software information associated with software programs that are installed in the user end;

in step d), the user end executes the terminal program for further scanning software programs installed in the user end to obtain software information associated with the user end, and the verification data is obtained according to the hardware list and the software information; and in step e), the network authentication device verifies the identity of the user end by comparing the verification data with the hardware information and the software information stored in step a).

12. The network authentication method as claimed in claim 11, wherein the software information includes a name and user setting of each of the software programs, and memory size assigned to each of the software programs.

13. The network authentication method as claimed in claim 11, wherein the user end scans the software programs without accessing files and personal data associated with the software programs.

14. The network authentication method as claimed in claim 11, wherein the hardware information and the software information stored in step a) serve as reference data, and in step e), the network authentication device verifies that the identity of the user end is authorized and determines that the verification of the user end is successful when similarity between the verification data and the reference data is greater than a predetermined standard.

15. The network authentication method as claimed in claim 14, the network authentication device is configured to automatically update the reference data stored therein with the verification data when the similarity between the verification data and the reference data is greater than the predefined standard, such that the verification data is stored in the network authentication device and serves as the reference data.

16. The network authentication method as claimed in claim 1, wherein steps b) to e) are implemented within a specific session.

* * * * *